United States Patent [19]

Rasmussen

[11] Patent Number: 5,028,289
[45] Date of Patent: Jul. 2, 1991

[54] PROCESS AND APPARATUS FOR COMPRESSIVE TRANSVERSE STRETCHING OF POLYMERIC SHEET MATERIAL

[75] Inventor: Ole-Bendt Rasmussen, 23, Forchwaldstrasse, CH 6318 Walchwil, Switzerland

[73] Assignee: Ole-Bendt Rasmussen, Walchwil/Zug, Switzerland

[21] Appl. No.: 246,544

[22] PCT Filed: Jan. 15, 1988

[86] PCT No.: PCT/GB88/00027
§ 371 Date: Sep. 8, 1988
§ 102(e) Date: Sep. 8, 1988

[87] PCT Pub. No.: WO88/05378
PCT Pub. Date: Jul. 28, 1988

[30] Foreign Application Priority Data

Jan. 16, 1987 [GB] United Kingdom ............... 8701047
Apr. 16, 1987 [GB] United Kingdom ............... 8709260

[51] Int. Cl.⁵ .................... B29C 55/12; B29C 55/18
[52] U.S. Cl. ........................ 156/229; 26/72; 264/280; 264/290.2
[58] Field of Search ........... 264/280, 286, 287, 288.4, 264/290.2; 425/369, DIG. 33, DIG. 236; 26/72, 106; 156/229

[56] References Cited

U.S. PATENT DOCUMENTS

| | | | |
|---|---|---|---|
| 3,220,057 | 11/1965 | Walton | 425/369 |
| 3,349,431 | 10/1967 | Rasmussen | 425/369 |
| 4,101,625 | 7/1978 | Haley | 264/287 |
| 4,153,664 | 5/1979 | Saber | 264/280 |
| 4,179,253 | 12/1979 | Lightfoot | 264/286 |
| 4,285,100 | 8/1981 | Schwarz | 26/72 |
| 4,531,996 | 7/1985 | Sukewik | 1/1 |
| 4,629,525 | 12/1986 | Rasmussen | 264/290.2 |

FOREIGN PATENT DOCUMENTS 1447986 12/1966 France .

Primary Examiner—James Lowe
Attorney, Agent, or Firm—William J. Daniel

[57] ABSTRACT

Sheet material (4) is stretched transversely into longitudinally extending pleats by passage between intermeshing grooved rollers (A and B) having circularly or helically extending grooves in their surfaces. Each groove is formed of a base (6a, 6b) and side walls (5a, 5b) inclined outwardly to a peak (7a, 7b). Portions of adjacent side walls (5a, 5b) are parallel to one another. The peaks are less than about 3 mm apart and the film is stretched by the peaks and is compressed between the side walls by forcing the rollers together. The pleated material is generally then stretched longitudinally substantially to eliminate the pleats and it may then be again stretched transversely between a further set of intermeshing grooved rollers.

20 Claims, 3 Drawing Sheets

PROCESS AND APPARATUS FOR COMPRESSIVE TRANSVERSE STRETCHING OF POLYMERIC SHEET MATERIAL

FIELD OF THE INVENTION

This invention relates to process and apparatus for stretching polymeric sheet material by passage between intermeshing grooved rollers and thereby effecting both transverse stretching and compression of the material.

BACKGROUND OF THE INVENTION

It has been known for forty years to achieve transverse tentering by passage of the film between grooved rollers wherein each groove extends substantially helically or circularly around each roller and consists of a base, a peak at each side, and side walls that extend between the base and the peaks. The intermeshing of the peaks, as the rollers come together in the nip, causes the material to be stretched transversely into pleats that extend substantially in the machine direction. Depending upon whether the grooves are circular or helical, the pleats will extend diagonally or substantially exactly along the machine direction.

In all these methods the film is relatively freely suspended between the peaks even at the point of greatest intermeshing. If the peak is narrow relative to the film thickness the effect of the peak is to cause stretching mainly on the peak, but if the peak is relatively broad then stretching occurs irregularly between the peaks. Accordingly the process is normally repeated several times but still yields a profiled product and the profile is then non-uniform.

In some processes the side walls of the grooves are outwardly inclined. For instance in JP-B-4829386 such an apparatus is shown in which the peak height is 10 mm, and the separation of adjacent peaks appears also to be about 10 mm. In each groove the film is squeezed between the base and the peak (having a radius of curvature of 4 mm) of the corresponding groove but the film apparently is not under compression at other positions within the groove. Thus it is not squeezed between the side walls. The main purpose of this step seems to be uniaxial orientation, since biaxial orientation is achieved in the overall process (and in the process of JP-B-4619831) by passing the sheet material subsequently through intermeshing grooved rollers in which the grooves extend axially. Transverse stretching by intermeshing grooved rollers in which the side walls are outwardly inclined is also described in Schwartz U.S. Pat. No. 4,116,892.

All the stretching is caused by the peaks and the outwardly extending side walls play substantially no part in the process. A design that has generally been found more satisfactory has vertical side walls, thereby leaving a greater amount of space for free movement of the film between intermeshing peaks. Such apparatus is described in GB 1,526,722, 1,526,723 and, especially, 1,526,724.

Unfortunately in such apparatus the peak separation cannot be too small, e.g., less than about 2 mm, as otherwise there is substantial risk of mechanical damage to the peaks. Also only relatively thin polymeric sheet materials (e.g., below 200 or 300 g/m$^2$) can be handled when the peaks are close, e.g., about 2 mm or a little more.

It would be desirable to reduce the risk of damage to the peaks and to be able to obtain a more uniform profile and/or to be able to stretch heavier material. It would also be desirable to be able to achieve more uniform effect on the sheet material in a single pass than has been obtainable previously. These objectives would be desirable not only for transverse stretching of single sheet material but also for fibrilation of appropriate sheet materials and for bonding laminates.

SUMMARY OF THE INVENTION

In the invention, continuous polymeric sheet material is stretched by a process comprising transverse tentering of the material by passage between intermeshing grooved rollers in which each groove extends substantially helically or circularly around each roller and consists of a base, a peak at each side and outwardly inclined side walls that extend between the base and the peaks, and the sheet material is thereby stretched transversely into pleats that extend substantially in the machine direction, and the separation between adjacent peaks is less than about 3 mm and the side walls of intermeshing grooves have portions that are substantially parallel to each other and the sheet material is compressed between substantially every pair of the said substantially parallel side wall portions by forcing the rollers together to effect the stretching by combined tentering or stretching and compression.

Apparatus according to the invention comprises the defined intermeshing grooved rollers wherein the separation between adjacent peaks is less than about 3 mm and the side walls of intermeshing grooves have portions that are substantially parallel to each other, and the apparatus includes means for forcing the rollers together so as to squeeze the sheet material between substantially every pair of substantially parallel side wall portions.

GENERAL DESCRIPTION OF THE INVENTION

By the invention it is possible to obtain a surprising improvement in homogeneity in the stretching pattern and increased strength properties (especially tear propagation strength and puncture strength and impact strength). Thick films, typically of a thickness that could not be satisfactorily processed by the earlier processes, can be processed in the invention to give a product in which any profiling is regular and therefore acceptable while thinner films can be processed to give a substantially uniform, non-profiled film.

If the film is being fibrillated during the process (e.g., by puncturing it prior to the process or by reliance upon foaming or the presence of grains in the film) a finer and more uniform fibrillation pattern is achieved. When two sheet materials are to be bonded during the stretching, improved bonding is often achieved. The risk of damage to the peaks is lessened.

The transverse stretching of the invention can be described as a transverse calendering process and involves both transverse stretching and calendering, whereas the prior processes only involved the stretching. The stretching occurs as the film enters the nip between the rollers and often also while it is in the nip. The compression occurs at the point where the two rollers are under pressure. It is essential that the peak separation or pitch (measured along the axial length of the roller) is low, below 3 mm, as the advantages of the invention are not obtained at greater peak separations than this. In practice the separation is normally about 2 mm or below since best results are obtained at values below 2 mm and results deteriorate as the separation increases. For instance 2.5 mm is often a suitable maximum for most processes and materials. At these low peak separations the length of each side wall is inevitably also low (generally less than about 2 mm) and this is important. Cold flow of sheet material under compression between substantially parallel surfaces can only occur over a very short distance. If the side walls were very much longer than about 2 mm a much less uniform film structure would be obtained. The peak separation, and the length of each side wall, is generally in the range 1 to 2 mm.

Preferably each peak has a substantially semi cylindrical cross-section with a radius typically of 0.1 to 0.5 mm, often 0.2 to 0.4 mm. Preferably the peak radius is of the same order as the film thickness. For instance good results are obtained when the peak radius is about 0.2 mm and the film is about 200 μm thick, but satisfactory results can then still be obtained at thicknesses of, e.g., 500 μm.

The peak and base generally merge into a part of the side wall that is substantially flat in cross section and that typically extends over 25 to 75% of the distance between the peak and base. The portion that is parallel with the portion of an intermeshing groove is generally this flat portion. Generally it is desirable for the film to be under compression over as much of the side wall as possible but satisfactory results can be obtained even if the portion extends only a minor portion of the height of the side wall. The side walls generally extend at an angle of about 45° to about 70° relative to the axis, so that the angle defined by the walls at the peak is about 40° to 90°, preferably 50° to 60°.

Preferably the base of each groove is shaped so that the film is not under compression between a peak and the associated base, e.g., so as to leave a small reservoir between the film that is being stretched over the peak and the base, as shown in FIG. 2 of the accompanying drawings.

The grooves may be truly or substantially circular or helical. The angle of the groove to the true circle (and thus the machine direction) is generally not more than about 20°, and is preferably below 15°, since if the angle is too large it can be difficult to ensure satisfactory intermeshing. Thus the groove is preferably at an angle of more than 70° to the axis. The intermeshing grooves of the rollers must match exactly in order that they intermesh without fouling. The rollers should be of steel or other rigid material, preferably hardened steel.

The degree of transverse stretching for any particular polymeric sheet material depends in part upon the degree and angle of melt orientation, the pressure between the rollers, the thickness of the sheet, and the speed at which the sheet material passes through the rollers. Generally the rollers are forced together with a pressure of at least 17 kg per centimeter axial length. This can give useful transverse stretching, e.g., at least 10%, at relatively low speeds of travel, e.g., 5 or 10 meters/minute. However preferably the rollers are forced together with pressures of above 50 kg/cm and normally above 100 kg/cm, e.g., 200 to 300 or even up to 500 kg/cm axial length, or even higher, since this can give good transverse stretching at high rates of travel, e.g., 40 meters/minute or double this or more. Preferably the amount of transverse stretching in a single pass between the intermeshing rollers is at least 15%, e.g., up to 50% or more. The amount of stretch is the difference between the straight line width of the material before the transverse stretching and the length of a median line through the pleated material.

It is necessary that the spacing between substantially every pair of side walls should be substantially equal along the entire length of the rollers in order that the film is subjected to substantially equal pressure at each position along the rollers. Preferably the spacing between each pair is within ±15 microns, or at the most 10 to perhaps 15 microns. Unfortunately it is difficult to ensure this degree of accuracy over more than, e.g., 50 cm roller length and if uniform separation is not achieved then there is a risk of breaking the peaks, in addition to producing film of inferior quality. Even if a long roller were to be machined sufficiently accurately, small and accidental temperature differences between the rollers or along the length of the rollers will cause differential thermal expansion of the rollers. Also it is difficult, due to deflections, to apply pressure uniformly over very long rollers. Also folds or dirt in the polymeric material may concentrate the forces over a small area and break the peaks.

Preferably at least one of the rollers is provided by a plurality of shorter rollers that are biased to the long, or main, roller. In particular, one of the rollers preferably comprises a long roller and the other roller is provided by a plurality of short rollers that are substantially independently biased to the long roller with equal pressure, per centimetre axial length, and that are axially located so that, together, they intermesh with the long roller over its entire length. If desired there can be more than one long roller arranged axially to make up the entire width of the sheet material, but generally there is a single long roller of the desired sheet material width and a plurality of short rollers. By this means it is possible to achieve the results of the invention even though the width of the film, and therefore the long roller, can be more than 2 meters, e.g., 5 meters or more.

Generally there are three or more short rollers each generally being below 50 cm long, and each is responsible for stretching part only of the film, the short rollers being arranged so that all the film is stretched, and optionally with small overlaps of the stretched portions. It is often preferred to make the short rollers as short as possible the provision of necessary bearings and supports will conveniently permit, for instance typically 4 to 15 cm long, since this facilitates conducting the process on wide film and under high pressure. Sometimes it is preferable for a short roller to be the length of, for instance, only 1 or 2 substantially circular grooves. Each short roller is individually biased towards the long roller with the desired force, for instance by action of a spring or, preferably, by hydraulic or pneumatic means. Direct contact of the intermeshing rollers in the absence of the film should be avoided and if the machinery is used for different film widths, or if the position of the side edges varies, it is easy to take short rollers at one or both sides of the film in and out of contact, e.g., by turning on and off the hydraulic or pneumatic pressure.

The short rollers are preferably arranged in mutually staggered rows at different peripheral positions on the longitudinal roller, the staggering being such that the short rollers together cover substantially the entire length of the long roller, optionally with small overlaps. Preferably the short rollers are located in two mutually staggered rows at substantially diametrically opposite positions on the long roller. By arranging the short rollers in this manner, deflections of the long roller are minimised. Near the ends of each short roller, corresponding to an area of overlap between rollers, the short roller may be slightly tapered so as to fade the stretching effect.

In order to facilitate the machining, the long roller may itself be formed from a plurality of roller segments that are firmly connected to one another in the axial direction. Preferably each of the roller segments substantially matches each of the short rollers. At the connections, each segment will end either in a part groove or, preferably, in a part peak. In order to avoid the need for extreme accuracy when fitting the segments together and to reinforce the ends of the segments, each pair of connected part-grooves or part-peaks can be made, for example, 0.1 to 0.5 mm wider than the overall width of, respectively, the grooves or peaks. The resulting small irregularities in optical and other properties will be acceptable for most uses of the sheet material.

If the grooves are helical, it will be necessary to drive both intermeshing rollers (e.g., the long roller and all the short rollers) but if the grooves are circular it may be sufficient to drive only one of the intermeshing rollers. The short rollers can then be idler rollers. In order to reduce the axial length of each short roller it is preferred that the bearing or bearings for each roller is inside the roller and the short rollers rotate around a fixed shaft carried on a forked or other suitable support. When it is necessary to drive the short rollers the rollers can be flexibly coupled together and it may then be necessary for the bearings to be axially outside the rollers. For instance drive can be transmitted along the flexible axis of a series of flexibly coupled short rollers by couplings, between each adjacent pair of rollers, that comprise a pair of plates that have fingers or other interengaging members and that are pressed together but can individually move a small radial and axial distance.

In an alternative system the short rollers are arranged on a common, long, roller core using a flexible coupling between each short roller and the core. The coupling comprises springs or rubber or other suitable flexible means by which the short rollers can be rotated with the core and by which roller pressure exerted on the core towards the long roller is transmitted through the short rollers. Preferably the flexible coupling also comprises guides which only permit axial and radial, but not tangential, movement of the short roller relative to the core. For instance cylindrical grooved sections of steel may be fited around a rubber coated core. This apparatus minimises marking of the sheet in the boundaries between the different stretching zones of adjacent rollers but suffers from the disadvantage that it can be difficult to achieve high and even pressures.

It is desirable that at least one of the intermeshing rollers should be supported sufficiently slidable along its axis to allow self adjustment of the intermeshing teeth of the rollers. For instance when there are long and short rollers the long roller may be mounted rigidly and the short rollers may be mounted so as to allow self adjustment by axial movement along the axis.

The pleated sheet material obtained by the described process may be subjected to various post-treatments. Preferably the material, substantially immediately and therefore without prior elimination of the pleats, is stretched longitudinally at a stretch ratio that is sufficient substantially to eliminate the pleats. This can lead to very uniform stretching and it is often advantageous to conduct the stretching at low temperatures, near or preferably below room temperature. This method will normally reduce the splitability of the sheet material.

The initial transverse stretching, generally followed by longitudinal stretching, creates microscopic initiation or stretching zones and these impart satisfactory properties such that further treatment is not essential. Preferably however the resultant longitudinally stretched material is subsequently stretched transversely. Thus the defined process of the invention may be repeated, preferably at a temperature about 50° C. or below, so as to give a biaxially oriented sheet with minimum variations in thickness. Alternatively it may be satisfactory to stretch the sheet transversely by conventional intermeshing grooved rollers, i.e., rollers in which each groove extends substantially helically or circularly around each roller and is defined by a pair of peaks and side walls and the sheet material is stretched around each peak substantially without being squeezed between adjacent side walls. Because the microscopic stretching zones act as initiators for subsequent stretching, satisfactory results can be obtained with relatively coarse grooved rollers, for instance with a peak separation of up to about 40 or 50 mm, even when the stretching temperature is below 50° C.

Preferably the width of the sheet material (i.e., the transverse linear separation of the side edges) after the initial transverse stretching process of the invention is about 100% to 130%, preferably about 100%, to 110% of the initial width, and after the longitudinal stretching it is preferably about 70 to about 100%, most preferably about 100% of the initial width, and after any further lateral stretching using intermeshing grooved rollers it is preferably about 110% to 200%, preferably about 120% to 180%, of the width after the longitudinal stretching. Thus preferably the transverse width remains substantially unchanged after the frist transverse and longitudinal stretching processes but may increase in the final transverse stretching.

The sheet material may have an initial gauge that is normally below 1 mm and generally below 600 $\mu$m, preferably below 500 $\mu$m, or (indicated in weight) is preferably below 600g/m$^2$, most preferably below 500 g/m$^2$. Its gauge is generally above about 200 g/m$^2$ and above about 200 or 300 $\mu$m, although it can be thinner, e.g., down to about 100 $\mu$m. The polymeric material preferably comprises polyalkylene polymer, preferably an ethylene or propylene homopolymer or copolymer, in particular it may be iso-and syndio-tactic polypropylene, high density polyethylene (HDPE) (often high molecular weight), low density polyethylene (LDPE), lineary low density polyethylene (LLDPE), and mixtures and coextrudates.

The sheet material may comprise a plurality of layers and these may be bonded or unbonded before the process. In one preferred process the sheet material comprises an unbonded laminate of two bondable sheet materials and the laminate is bonded by the process. In particular the transverse stretching of the invention followed by the described longitudinal stretching can lead to higher bonding forces than the known grooved roller lamination procedures. Preferably at least one of the two sheet materials that are to be bonded is a coextruded laminate having a bonding surface layer facing the other sheet material of the pair. Optimum physical and other strength properties are generally obtained when all stretching steps are conducted at a temperature substantially below the temperature at which the contacting surfaces of the laminate would bond together by simple contact.

The sheet material that is used in the invention may comprise a sandwich of uniaxially oriented sheet materials having their directions of orientation transverse to each other. Thus the process can result in biaxial stretching of cross-sandwiched film. This film may be produced by melt orienting a tubular film and cutting it helically at an angle to the direction of orientation so as to produce an obliquely oriented sheet and cross laminating it with a similarly produced oriented sheet material. The biaxial stretching can then be combined with bonding of the layers, as described above. Preferably the resultant sheet material is a cross laminated film as described in GB 1,526,722. The invention permits the treatment of polymer compositions that are stiffer than have been usable previously to produce a final sheet having a more uniform thickness than has been obtainable previously.

It is generally desirable for a polymeric sheet material to have at least one surface which is as smooth as possible. It is possible to obtain a surprising smoothness on one side if the stretched sheet material that is obtained in the process comprises a laminate of two or more separable sheet materials and the separable sheet materials are peeled apart after the process. The facing layers of the separable sheet materials can then be of very high surface quality and smoothness. For instance the surface can then have increased gloss, an increased coefficient of friction, improved print quality performance when printed, and improved heat and supersonic sealability. It exhibits substantially complete lack of micro topography when examined by a scan electron microscope. To facilitate separation, at least one sheet material of each separable pair is preferably a co-extruded laminate having a release surface layer facing the other sheet material of the pair. The release surface layer can be of any material that will promote peeling. It may be selected to further impart to the peeled sheet material the desired surface properties, e.g., frictional or easy heat sealing properties. For instance heat sealable sacks can be made with a smooth inner surface exposed by the peeling (giving good sealing) and a corrugated outer surface (giving stacking stability since dust will collect in the furrows of the corrugations). Alternatively a glossy outer surface can be provided for printability.

At the same time as selecting materials such that two or more sheet materials can be peeled apart after the process of the invention, it is also possible to select materials such that two or more other layers become bonded to one another, in the manner described above. Thus a number of separate plies (some in the form of a co-extruded film) may be subjected to the process of the invention to cause bonding of sets of two, three or more layers into laminates while permitting peelability of adjacent laminates. For instance each peelable laminate may be provided by bonding together, during the transverse and longitudinal stretching, two co-extruded films each comprising a surface layer, at least one strength layer and a surface bonding layer, with the surface bonding layers facing each other and peelability may be provided by selecting appropriately the surface layer on the innermost face of the laminate or by providing a separate release layer between the two sets of co-extruded layers.

When, as often happens in such processes, the thickness of sheet material being passed between the intermeshing rollers is rather high, the pleats may be rather deep and it can then be advantageous to subject the pleated sheet material to a heat treatment while allowing shrinkage in at least its transverse direction. The sheet material may be heated before or after the peeling process. If relatively thin zones are formed by overstretching during passage between the intermeshing rollers, they have a pronounced tendency to contract when heated to a suitable temperature, thus causing transverse shrinkage, and so variations in thickness of the transversely stretched material can be reduced or almost eliminated by the heating. Preferably the heating results in at least 7% shrinkage, and often at least 12% shrinkage, in the transverse direction. Generally the shrinkage is below 30%. The heating may be conducted in an oven but preferably is effected by contacting the material with a heated roller, which may thus have a stabilising effect on the transverse shrinkage. Preferably the heating is conducted while the sheet material is still longitudinally pleated, so as to permit an even shrinkage while the sheet material still contacts the heated roller. Reference should be made to U.S. Pat. No. 4,629,525 for additional information on suitable heat treatments and cross laminates that can advantageously be subjected to the treatment.

A particularly preferred main layer for use in a laminated sheet produced in the invention is formed of a blend of high molecular weight high density polyethylene with significantly lower molecular weight low density polyethylene, the latter preferably being selected from copolymers and/or branched polyethylenes which have the same or higher elongation at break (tested at room temperature under slow stretching) as the high molecular weight polyethylene and which are capable of distinctly segregating, while forming a distinct microphase, from the high molecular weight polyethylene on cooling of a molten homogeneous blend of the components. The blending ratio of the polyethylenes is preferably 25:75 to 75:25. The inclusion of polypropylene having significantly lower molecular weight than high molecular weight polyethylene can also be advantageous, in amounts of from 0 to 70%, based on the combined weight of polypropylene and both polyethylenes.

Throughout this specification the high molecular weight high density polyethylene (HMHDPE) preferably has a melt flow index of about 0.2 or lower by ASTM D1238 condition E and the low density polyethylene (LDPE) is preferably linear low density polyethylene (LLDPE).

A further object of the embodiment of the invention, in which the stretched sheet material comprises a laminate of two or more separable sheet materials and the separable sheet materials are peeled apart after the process, is to provide an improved sheet material with one side mainly consisting of a relatively hard and the other of a relatively soft polymer material. The side mainly consisting of the hard material can highly improve wear and puncture properties.

The presence of a layer of hard polymer material will always tend to give deeper profiling, when the sheet material is stretched between grooved rollers, but it was found in the experiments leading to the present invention, that hard material in the core of a sheet under grooved-roller stretching gave much less profiling than similar material at one or both surfaces.

Accordingly, it can be very advantageous to arrange the layer of hard polymer in or near the middle of the sheet during the stretching, and bring it against or near to the surface by the peeling process described above.

As examples, the relatively soft material on one side can be a polyethylene composition, preferably a combination of HMHDPE and LLDPE as described above, and the relatively hard material on the other side can be plain or almost plain HMHDPE, or alternatively can be mainly polypropylene.

BRIEF DESCRIPTION OF THE DRAWINGS

The invention is illustrated in the accompanying drawings in which.

DETAILED DESCRIPTION OF ILLUSTRATED EMBODIMENT

Figure 1:
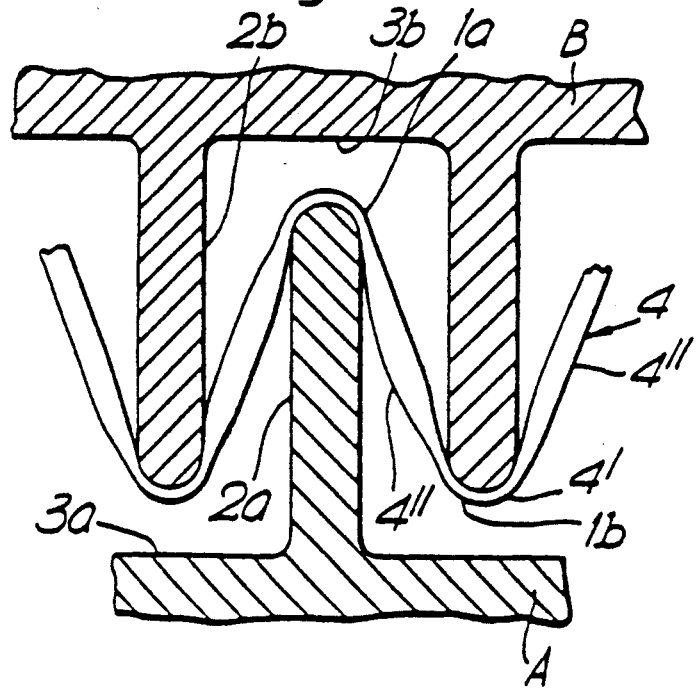
FIG. 1 shows, on an approximately 20× enlarged scale, the intermeshing surfaces of a grooved roller system as described in GB 1,526,724.

Conventional intermeshing rollers A and B for the transverse stretching of a film 4 are shown in FIG. 1 and have circular or hilical grooves formed of a base 3a, 3b, side walls 2a, 2b and peaks 1a, 1b. The peaks are about 500 μm wide and have a separation of about 2 mm. The film is stretched at 4' around each peak if the peak has a small radius (having an order of magnitude generally similar to the film thickness) and is in a relatively relaxed state, and is less stretched at 4" between the peaks. If the peak has a radius much larger than the film thickness, stretching occurs primarily between the peaks.

Figure 2:
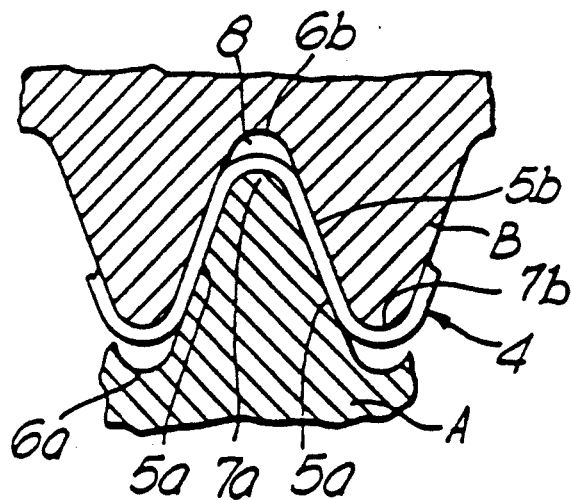
FIG. 2 shows, on a similar scale, the intermeshing surfaces of a grooved roller system in accordance with the invention.

The rollers used in the invention have grooves as shown in FIG. 2. Each groove comprises a base 6a or 6b, outwardly inclined side walls 5a or 5b and a peak 7a or 7b. The side walls 5a and 5b of opposing rollers are parallel over a portion of their length. Each base 6a and 6b is preferably of a size such that the film is not under compression between the peak and the base, even though it is under compression between the side walls 5a and 5b. For instance each base may be shaped so as to provide a small space 8 between the film and the base. The peaks 7a are preferably separated by less than about 2 mm.

Figure 3:
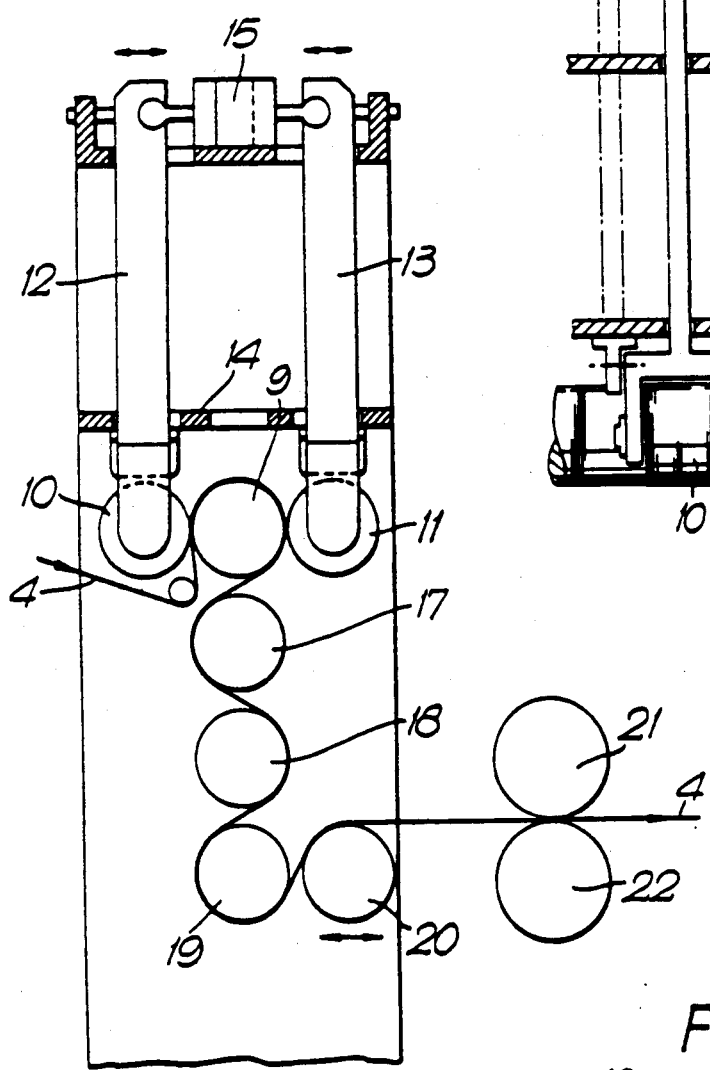
FIG. 3 is an end diagrammatic view of an apparatus according to the invention that includes both intermeshing rollers according to the invention and longitudinally stretching rollers.
Figure 4:
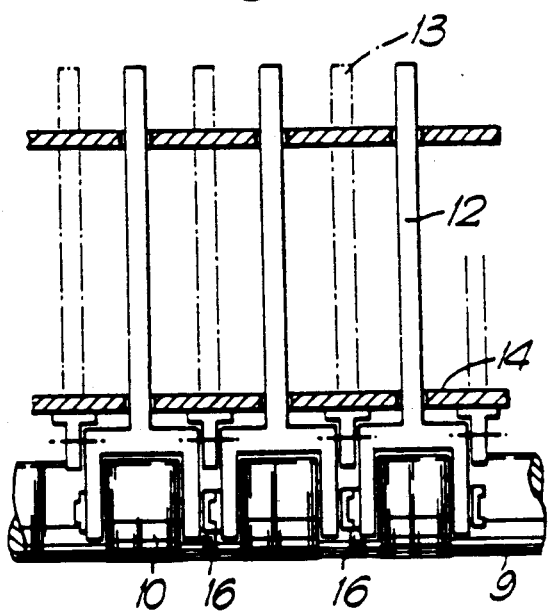
FIG. 4 is a side view of the top part only of the apparatus of FIG. 3.
Figure 5:
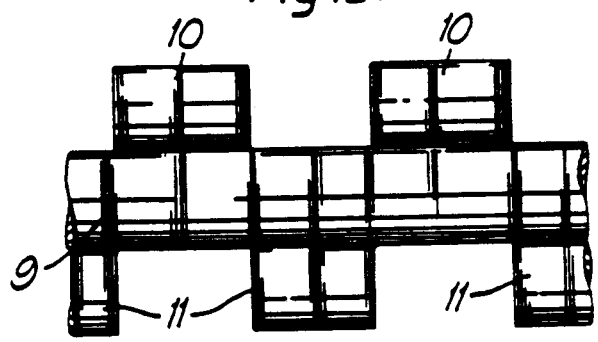
FIG. 5 is a plan view of the intermeshing rollers of FIG. 3, the couplings and all other parts being omitted.

The apparatus of FIGS. 3 to 5 comprises a long grooved roller 9 and mutually staggered rows of short grooved rollers 10 and 11 on opposite sides of the roller 9. Each of the rollers has a groove profile as shown in FIG. 2. The rollers 10 and 11 are supported by, respectively, arms 12 and 13 which are pivoted at the frame 14 and are actuated by hydraulic or pneumatic means 15 so that the rollers 10 and 11 can be pressed against the roller 9 with any chosen force. In practice the roller 9 is driven (by means not shown) and the rollers 10 and 11 can then be driven by the roller 9 through the sheet 4.

However if desired the rollers 10 and 11 can be driven together through flexible couplings 16.

The apparatus may include a longitudinal stretching unit consisting, in FIG. 3, of four smooth rollers 17, 18, 19 and 20 driven at a speed so as to give the desired degree of stretching, and it may also include at least one further pair of intermeshing grooved rollers 21 and 22. These may be of either design shown in FIG. 1 or FIG. 2, depending upon the desired purpose. If a conventional design, similar to FIG. 1, is chosen, the peak separation an be sufficiently great (e.g., 40 mm) and the peak width so high that stretch ratios up to about 1.8:1 or more can be obtained in one stretching step without any practical risk of damaging the roller surface. With so coarse a roller surface pattern, useless results would have been obtained in prior processes. Good results are obtained in the invention because of the micro-stretch zones formed in the first stage. The peaks are, however, preferably tapered at the tips, with a semi-cylindrical peak radius of about 0.1 to 0.4 mm.

The grooved rollers 9, 10 and 11 (and 21 and 22 if present) must be made of hard material, generally hardened steel. Typically the rollers all have diameters in the range 50 to 250 mm, generally 75 to 200 mm. For instance the long roller may have a diameter of about 150 mm and the short rollers may have a diameter of about 100 to 150 mm.

Slight axial movement of the rollers 10 and 11 is permitted to improve accurate intermeshing. The spacing between the surfaces 5a and 5b should be within ±5 μm along the length of roller 9. In a typical apparatus each roller 10 is around 12 cm long, and the peaks are 1.4 mm apart, the radius of each peak is 0.2 mm and the angle defined by the side walls at the peak is 55°. The sheet 4 may enter the apparatus preheated, e.g., to 35° to 50° C. and the long roller 9 may be preheated to about the same temperature. Rollers 17 to 20 will normally also be heated, but preferably to a lower temperature.

Figure 6:
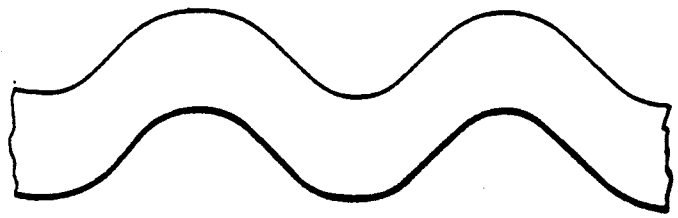
FIG. 6 to 8 are drawings prepared from mirographs of cross sections of various sheet materials, FIG. 8 being comparative.

The sheet emerging from the nip between rollers 9 and 11 will have a longitudinally pleated structure as shown in FIG. 6 (which shows a 4-ply cross laminate 240 μm thick in the portions which have been under compression).

Figure 7:
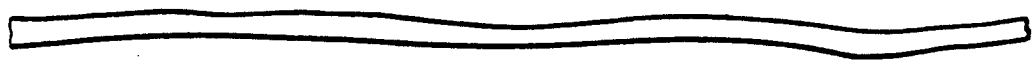

The cross laminate shown in FIG. 7 is a 2-ply laminate made in Example 1; each ply was about 90 g/m² and 300 mm wide before stretching and had been given a structure similar to FIG. 6 by passage between rolls 9, 10 and 11 having a surface configuration as in FIG. 2, and had then been stretched longitudinally substantially to eliminate the pleated configuration, and had then been stretched by four passages between grooved rollers as shown in FIG. 1, having a peak separation of 1.8 mm, followed by a final longitudinal stretch.

Figure 8:
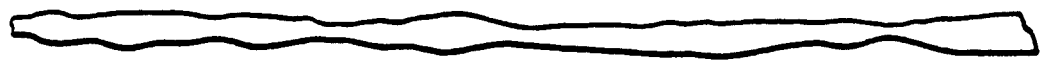

The film of FIG. 8 was formed, as in Example 2, from the same sheet material and was subjected to the same process steps as the film of FIG. 7 except that grooved rollers of the type shown in FIG. 1 and having a peak separation of 1.8 mm were used in place of the grooved rollers of FIG. 2. The film in both cases (FIGS. 7 and 8) was allowed to spread freely between each of the conventional grooved roller stretching steps, while retaining a wavy shape. Spreading was not allowed between the final conventional grooved roller step and the final longitudinal stretching. The total stretch ratios are about 1.4:1 in each direction and the final guage is 90 g/m². It is clearly apparent that the film made by the invention, FIG. 7, is of much more uniform thickness than the film made using conventional grooved rollers, FIG. 8.

EXAMPLES OF THE INVENTION

Example 1

Two co-extruded films were passed between the nips between rollers 10 and 9, and 10 and 11, in FIG. 3 and which have a peak separation of 1.4 mm, a tip radius of 0.2 mm and a diameter about 100 mm. Each short roller is 120 mm long. The grooved rollers 20, 21 have a peak separation of 1.8 mm and a tip radius of 0.25 mm. Each film consisted of three layers, a heat sealing surface layer constituting 15% of the thickness and formed of LLDPE, a laminating layer constituting 10% of the thickness on the opposite surface formed of 80% LLDPE and 20% EPDN, and a central layer, constituting 75% of the film, formed of 50% HMHDPE and 50% LLDPE. The films were arranged with the laminating layers in contact. The films were made by extrusion at about 240° C. as a tubular film with a blow ratio of 1:1 followed spiral cutting at 45° to form perpendicular cross lamination. Each film was about 90 g/m² (approximately 100 μm thick). The two films were passed between the grooved rollers 9 and 10/11 with a hydraulic pressure of 1.46 ton on each 120 mm grooved roller (approximately 120 kg/per axial centimeter). The speed at the entrance to the apparatus was 10 m/min and the ambient temperature and the temperature of each roller was about 35° C. The film was hereby transversely stretched and resulted in a pleated configuration generally as shown in FIG. 6. Without any transverse tentering to eliminate the pleats, it was then longitudinally stretched, then transversely stretched in four steps as described above for FIG. 7, and finally again stretched longitudinally. Hereby it acquired the configuration shown in FIG. 7. Its falling ball (1 kg alumina) impact strength for a 90 g/m² film was 150 cm but in the comparison of FIG. 8 an 87 g/m² prior art film had a value of 90 cm.

Example 2

The process of Example 1 was repeated except that it was stopped after the initial transverse stretching and the stretch ratio after the treatment around roller 9 was recorded at different hydraulic pressures on each 12 cm roller. In all these ratios, the measured value is the ratio of the length of the median line through the pleated film to the straight line width of the film as measured before the stretching. The stretch ratio was 20%, or 1.2, even when the force on the roller was as low as 17 kg/cm. The following values were recorded.

| | Force (tons) | | | | | |
|---|---|---|---|---|---|---|
| | 0.209 | 0.418 | 0.627 | 0.835 | 1.04 | 1.25 |
| Stretch | 20% | 30% | 40% | 45% | 50% | 60% |

Example 3

The example relates to the manufacture of a high-strength cross-laminate in a commercial process using a technique in which the sheet is stretched and laminate while in double thickness and is separated at the end of the process. Each layer is a coextruded film and contains (1) one surface layer which acts as release layer in the manufacturing process, and which at the same time improves the heat-sealing properties (in the following referred to as release/seal layer) and (2) another surface layer which promotes the bonding (blocking) of the plies of the laminate to each other.

A tubular film is extruded comprising a main layer in the middle, in which layer the strength essentially resides, and the above mentioned release and lamination layers.

The three layers form 75%, 15% and 10%, respectively, of the total film. The gauge of the extruded film is 70 g/m².

The main layer consists of a very intimately blended composition of 50% high molecular weight high density polyethylene (HMHDPE) of the trade name "Hostalen 9255", and 50% linear low density polyethylene (LLDPE) of melt flow index 1.0 of trade name "Dowlex 2045".

The release/seal layer consists of 100% of the same LLDPE.

The lamination layer consists of an intimate blend of 70% of the same LLDPE +30% EPDM of trade name "Nordel 1500".

The extrusion temperature is 240° C., the diameter of the annular extrusion orifice is 385 mm and the blow ratio 1:1.2. Each of the tubular films is cut helically under an angle of 45° and four such films, each having a width of about 100 cm, are laminated and stretched with the surface layers facing one another in the following sequence:

(1) lamination layer to lamination layer,
(2) release/seal layer to release/seal layer,
(3) lamination layer to lamination layer.

Initially, the assembly of the four films, which still are not bonded together, is preheated on a pair of rollers to about 40° C. and fed into the apparatus shown in FIG. 3 and Example 1.

The long roller 9 is formed of 20 segments of hardened steel each 120 mm long and the two rows of short rollers, each comprising 10 rollers, are also formed of hardened steel and each matches a segment. Each segment terminates at each end in a half-groove which is about 0.2 mm wider than the half width of the other grooves, so as to allow for inaccuracies in assembling the rollers. The segments are firmly screwed together axially on a common core. The segments and the short rollers have a diameter of 150 mm. The roller pressure is established hydraulically at 1.46 tons per short roller. The film speed entering the rollers in about 25 m/min. The grooved roller 9 is heated to 40° C.

The subsequent longitudinal stretching is with rollers at 30° C. and gives a stretch ratio about 1.3:1 measured in the relaxed state. Two pairs of conventional grooved rollers like 21 and 22 give a total transverse stretch ratio of about 1.4:1 at 30° C. These rollers have a peak separation of 4 mm and a semi-circular peak radius of 1 mm. After passage through the first set (but not after the second set) the pleated film is spread by means of banana rollers. While being stretched between the grooved rollers, the film is under a low longitudinal tension, permitting the films to shrink longitudinally between the grooved rollers to a final longitudinal stretch ratio of about 1.25:1. They are then further longitudinally stretched at 30° C. using conventional longitudinal stretching rollers until the pleats disappear.

After the longitudinal stretching, the laminate is introduced in paractically tensionless state (tension regulated by means of dancing rollers) into a free-shrink heat treatment unit in which they are first transversely stretched at 30° C. between a set of conventional grooved rollers as described above, and then immediately, still in a regularly pleated configuration transferred to an 80° C. hot steel roller and from this to two other 80° C. hot rollers. By the shrinkage, the pleats disappear but they have served to secure even shrinkage. From the hot rollers the laminate is transferred still in an almost tensionless state to a water-cooled roller. Finally, it passes through a set of nip rollers and is peeled into two half parts, each of which are strongly laminated. Prior to this peeling, all four films were bonded together almost at every spot of the interphases. The peeling is effected under a low draw tension by means of two sets of nip rollers. Finally, the two 2-ply laminates are wound up on bobbins. Intermeshing of grooved rollers and longitudinal stretch ratios are adjusted to give final stretch ratios 1.4:1 in both directions.

The gauge of the final 2-ply cross-laminate is about 70 g/m².

In order to investigate how safely the 4-ply laminate will delaminate into two half-parts also in case of production irregularities, holes of different irregular shape are cut in the film between the last transverse stretching station and the longitudinal stretching unit. However, even though the material around the holes are irregularly deformed by the stretching, the 4-ply laminate is still cleanly separated into two by the peeling process.

The surfaces of the final 2-ply laminates which were in intimate contact during the stretching operation and which subsequently were separated from one another are in the following called A surfaces, whereas the remaining surfaces of the final laminates are called B surfaces.

A visual examination of these surfaces shows that the A surfaces are much more glossy when light beams are directed against said surfaces. The static co-efficient of friction between two A surfaces which are in mutual contact is about 2.5 times as high as the static co-efficient of friction between two B surfaces. (See table below).

This is indicative for surface evenness which in turn determines sealing properties.

Examinations of the laminates of the invention under an electronic scanning microscope show that the A surfaces have significantly fewer microscopic irregularities than the B surfaces. It is believed that this is due to the fact that the material located adjacent to microscopic surface cavities tends to be overstretched because of the notch effect of said cavities, whereas microscopically small projections tend to be understretched or non-stretched. These differences are significantly reduced when the surface of one film is in so intimate contact with the surface of another film during stretching as achieved by transverse stretching between grooved rollers under roller pressure in the invention.

| Coefficients of static friction: | | |
| --- | --- | --- |
| | A to A | B to B |
| Machine direction | 1.2 | 0.42 |
| Transverse direction | 1.2 | 0.40 |

Static peel strength in optimised heat-seals, seam in transverse direction:
A to A: 5.5 kg/inch (2.2 kg/cm)
B to B: 4.8 kg/inch (1.9 kg/cm)

It should be observed that the A and B surfaces consist of identically the same LLDPE type.

I claim:

1. A process of stretching continuous polymeric sheet material in which the material is subjected to transverse stretching by passing the material between intermeshing grooved rollers in which the grooves extend substantially helically or circularly around each roller and are arranged in alternating valleys and peaks with outwardly inclined side walls that extend between the valleys and the peaks and the sheet material is thereby stretched transversely to increase significantly its transverse dimension and form the same into pleats that extend substantially in the machine direction, wherein the total roller length is at least 50 cm, the pitch between adjacent peaks is less than about 3 mm, the side walls of said intermeshing grooves have portions which are substantially parallel to each other, and the sheet material is compressed between opposed pairs of said substantially parallel side wall portions by forcing the rollers together under a substantially uniform pressure along their axial length of at least 17 kg/cm of said length but not sufficient to rupture said sheet material to a compression position in which the clearance between said substantially parallel side wall portions is smaller than the starting sheet thickness, and then subjecting said sheet material to at least one stretching step sufficient to remove substantially said pleats and impart a generally flat condition to the final sheet material while retaining therein a transverse dimension at least substantially equal to that of the starting sheet material.

2. A process according to claim 1 in which the are forced together with a pressure of at least 17 kg/cm and the pitch between adjacent peaks is about 2 mm or less.

3. A process according to claim 1 in which the distance between the base and the peak of substantially every groove is about 2 mm or less and the pitch between adjacent peaks is about 2 mm or less.

4. A process according to claim 1 in which the sheet material is longitudinally stretched and then transversely stretched by passage between intermeshing grooved rollers in which each groove extends substantially helically or circularly around each roller and is defined by a pair of peaks and side walls and the sheet material is thereby stretched transversely substantially without being squeezed between adjacent side walls.

5. A process according to claim 1 in which the longitudinally stretched sheet material is then transversely stretched by repeating said transverse stretching process.

6. A process according to claim 1 in which the sheet material comprises an unbonded laminate of two bondable sheet materials and the laminate is bonded by the process.

7. A process according to claim 6 in which at least one of the two sheet materials is a co-extruded laminate having a bonding surface layer facing the other sheet material of the pair.

8. A process according to claim 6 in which all the stretching steps are carried out at a temperature below the temperature at which the surfaces of the sheets bond together by simple contact.

9. A process according to claim 1 in which the sheet material comprises a sandwich of melt oriented sheet materials each with a main direction of orientation and having their main directions of orientation transverse to each other.

10. A process according to claim 1 in which the stretched sheet material comprises a laminate of two or more separable sheet materials and the separable sheet materials are peeled apart after the process.

11. A process according to claim 10 in which one sheet material of each separable pair is a co-extruded laminate having a release surface layer facing the other sheet material of the pair.

12. A process according to claim 1 in which the sheet material comprises a main layer formed of a blend of high molecular weight high density polyethylene with low molecular weight low density polyethylene.

13. The method of claim 1 wherein when said intermeshing grooved rollers are in said compression position, the clearance space between the opposed peaks and valleys is greater than the starting sheet thickness whereby sheet compression is essentially confined to said substantially parallel groove side wall portions.

14. Apparatus suitable for biaxial stretching of continuous polymeric sheet material and comprising intermeshing grooved rollers in which the grooves extend substantially helically or circularly around each roller and are arranged in alternating valleys and peaks with inclined side walls that extend between the valleys and the peaks, the total roller length being at least 50 cm, the pitch between adjacent peaks being less than about 3 mm, and the opposed side walls of said intermeshing grooves having portions which are substantially parallel to each other; means for passing the sheet material between said rollers; means for biasing the rollers together while the sheet material passes therebetween to undergo significant widthwise stretching and arrangement into longitudinally pleated condition, wherein one of the rollers comprises a single elongated roller and the other comprises a plurality of short rollers that are biased by said biasing means toward the elongated roller with substantially equal pressure, so that together they intermesh with said elongated roller over substantially its entire length; and downstream of said intermeshing grooved rollers at least one stretching means for stretching the sheet material emerging from said grooved rollers sufficient to remove substantially the pleats from the sheet material and impart a generally flat condition thereto while maintaining a sheet material width at least substantially equal to that of the starting sheet material.

15. The apparatus of claim 14 including means supporting said plurality of short rollers for individual axial relative movement sufficient to facilitate self-adjustment thereof into intermeshing relation with the long roller.

16. Apparatus according to claim 14 in which the pitch between adjacent peaks is about 2 mm or less.

17. Apparatus according to claim 14 in which the short rollers are substantially independently biased toward the long roller and are arranged in mutually staggered rows at different peripheral positions around the long roller.

18. Apparatus according to claim 14 in which the short rollers are located in two mutually staggered rows at substantially diametrically opposite positions around the long roller.

19. Apparatus according to claim 14 in which a number of the short rollers are arranged in arially spaced relation common roller core with a flexible coupling between the core and each such roller for rotating the rollers with the core and for biasing the rollers toward the long roller.

20. Apparatus according to claim 14 in which a series of pull rollers are positioned to receive sheet material from the intermeshing rollers and to longitudinally stretch the sheet material.

* * * * *

UNITED STATES PATENT AND TRADEMARK OFFICE
CERTIFICATE OF CORRECTION

PATENT NO. : 5,028,289
DATED : July 2, 1991
INVENTOR(S) : OLE-BENDT RASMUSSEN

It is certified that error appears in the above-identified patent and that said Letters Patent is hereby corrected as shown below:

In Claim 5, line 1, after "the", insert --sheet material is---.

line 2, cancel "sheet material is" and insert in lieu thereof --and--.

In Claim 19, line 2, change " arially" to ---axially--.

Signed and Sealed this

Tenth Day of November, 1992

Attest:

DOUGLAS B. COMER

*Attesting Officer*  *Acting Commissioner of Patents and Trademarks*